(12) United States Patent
Zhong

(10) Patent No.: US 12,289,021 B2
(45) Date of Patent: Apr. 29, 2025

(54) SHUNT ASSEMBLY

(71) Applicant: Schaeffler Technologies AG & Co. KG, Herzogenaurach (DE)

(72) Inventor: Guihui Zhong, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 350 days.

(21) Appl. No.: 17/884,015

(22) Filed: Aug. 9, 2022

(65) Prior Publication Data

US 2024/0055960 A1   Feb. 15, 2024

(51) Int. Cl.
*H02K 11/40* (2016.01)
*H01R 39/20* (2006.01)
*H01R 39/64* (2006.01)

(52) U.S. Cl.
CPC .............. *H02K 11/40* (2016.01); *H01R 39/20* (2013.01); *H01R 39/643* (2013.01)

(58) Field of Classification Search
CPC ....... F16C 41/002; H02K 11/40; H01R 39/00; H01R 39/60; H01R 39/643; H01R 41/00; H01R 41/02
USPC .......................................... 310/248, 251, 90
See application file for complete search history.

(56) References Cited

U.S. PATENT DOCUMENTS

| | | |
|---|---|---|
| 3,271,723 A | 9/1966 | Willing |
| 3,564,477 A | 2/1971 | Pompei |
| 4,801,270 A | 1/1989 | Scarlata |
| 7,136,271 B2 | 11/2006 | Oh et al. |
| 7,193,836 B2 | 3/2007 | Oh et al. |
| 7,339,777 B2 | 3/2008 | Barnard et al. |
| 8,764,301 B2 | 7/2014 | Winkelmann et al. |
| 9,175,728 B2 | 11/2015 | White |
| 9,653,193 B2 | 5/2017 | Windrich et al. |
| 10,253,818 B1 | 4/2019 | Ince et al. |
| 11,309,775 B2 | 4/2022 | Hubert et al. |
| 2006/0007609 A1 | 1/2006 | Oh et al. |
| 2016/0238074 A1 | 8/2016 | Preis et al. |
| 2016/0312834 A1* | 10/2016 | White ................. F16C 33/7823 |
| 2021/0115974 A1* | 4/2021 | Schamin ............... F16C 41/002 |

FOREIGN PATENT DOCUMENTS

CN   111219418 A   *   6/2020

* cited by examiner

*Primary Examiner* — James Pilkington
*Assistant Examiner* — Aimee Tran Nguyen
(74) *Attorney, Agent, or Firm* — Volpe Koenig

(57) ABSTRACT

A shunt assembly for a bearing configuration is disclosed herein. The shunt assembly includes a mesh layer that provides electric contact between a first and second conductive component. The mesh layer can be secured against one of the conductive components via application of a preload, which can be achieved by a spring, O-ring, or other element.

19 Claims, 8 Drawing Sheets

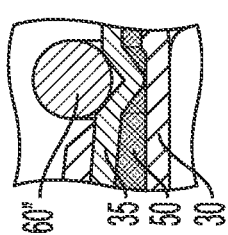
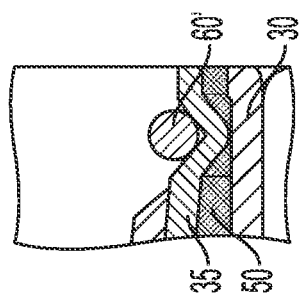
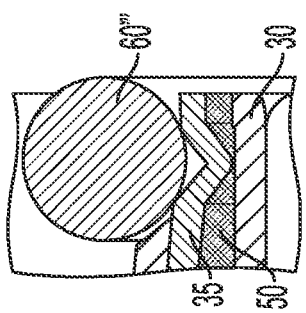
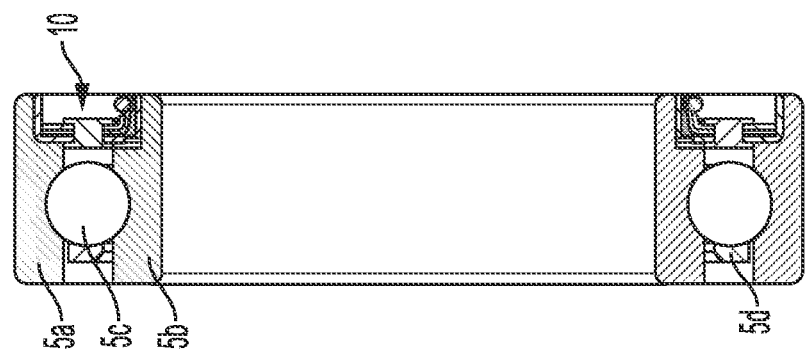

SHUNT ASSEMBLY

FIELD OF INVENTION

The present disclosure relates to a shunt assembly for a bearing arrangement.

BACKGROUND

As hybrid and e-axles are being more widely used, stray electrical current from drive motors has become an increasing issue, causing electrical arcing, pitting, and damage to bearings. Particularly in high speed applications, it is important to protect bearing raceways and rolling elements from electrical discharge machining (EDM), which can damage the bearing and cause failure of the bearing. This is particularly an important issue in a wet automatic transmission fluid (ATF), lubricated environment.

Shunts have been used in different bearing configurations that are dry, sealed from lubricants, or open, non-sealed environments. There is a need for a highly conductive shunt device that safely conducts current to ground, thereby preventing electrical discharge machining (EDM) damage to the bearing which can also be used in a wet environment.

SUMMARY

A shunt assembly is disclosed herein. In one configuration, the shunt assembly is configured for use with a bearing assembly that is designed for high speeds (i.e. at least 20,000 rpm) and also to operate in a wet (i.e. lubricated) environment.

The shunt assembly can include a first conductive component configured to engage with at least a first bearing ring and a second conductive component configured to contact at least a second bearing ring. A mesh layer contacts both of the conductive components and defines a conductive pathway between the first and second bearing rings.

A cushioning layer can be provided that is configured to compress and engage directly against the mesh layer. The mesh layer can be arranged between the cushioning layer and the second conductive component. A preloading component can be provided that is configured to apply a preload between the mesh layer and the second conductive component.

The first conductive component can include a conductive shunt mount, that is configured to be fixed relative to the first bearing ring, which can be the outer ring. The second conductive component can be a sleeve-like element that is configured to rotate with the second bearing ring, which can be the inner ring.

The mesh layer can be formed from carbon fiber and can be formed as a sheet. The mesh layer can be formed from ultra-conductive graphene sheets or carbon fiber fabric sheets.

The mesh layer can include a radial extension that contacts the first conductive component, and an axial extension that contacts the second conductive component. The mesh layer can have an L-shaped profile when view in cross-section. The mesh layer can lack any stray fibers or filaments, in one example.

The radial extension can define at least one opening configured to receive a fastening component. The radial extension can be formed as a plurality of radial extensions that have spacing therebetween in the circumferential direction. This spacing can help define an unobstructed lubricant flow path.

The cushioning layer and the mesh layer can be connected with each other, such as via a conductive epoxy or the cushioning layer can be molded over the mesh layer.

A backing component can also be provided for increased support and rigidity. The cushioning layer and the backing component can be connected with each other, such as via co-molding.

At least one fastening component can be configured to secure at least the first conductive component, the cushioning layer, and the mesh layer with each other. The fastening component can include a plurality of rivets, bolts, or other mechanical fasteners, and can be formed from a conductive material.

The first conductive component can include at least one lubrication passage, that is configured to allow lubricant to flow through the shunt assembly and lubricate any of the components of the associated bearing assembly.

The preloading component can be an O-ring, a spring (such as a garter spring), or any other component that is capable of providing a force or preload against the mesh layer to ensure adequate conductive contact with the second conductive component.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings:

FIG. 6A is another cross-sectional view of a bearing assembly including the shunt assembly.

FIG. 6B is a magnified cross-sectional view through a first preloading component of the shunt assembly.

FIG. 6C is a magnified cross-sectional view through a second preloading component of the shunt assembly.

FIG. 6D is a magnified cross-sectional view through a third preloading component of the shunt assembly.

DETAILED DESCRIPTION OF THE PREFERRED EMBODIMENTS

Figure 1:
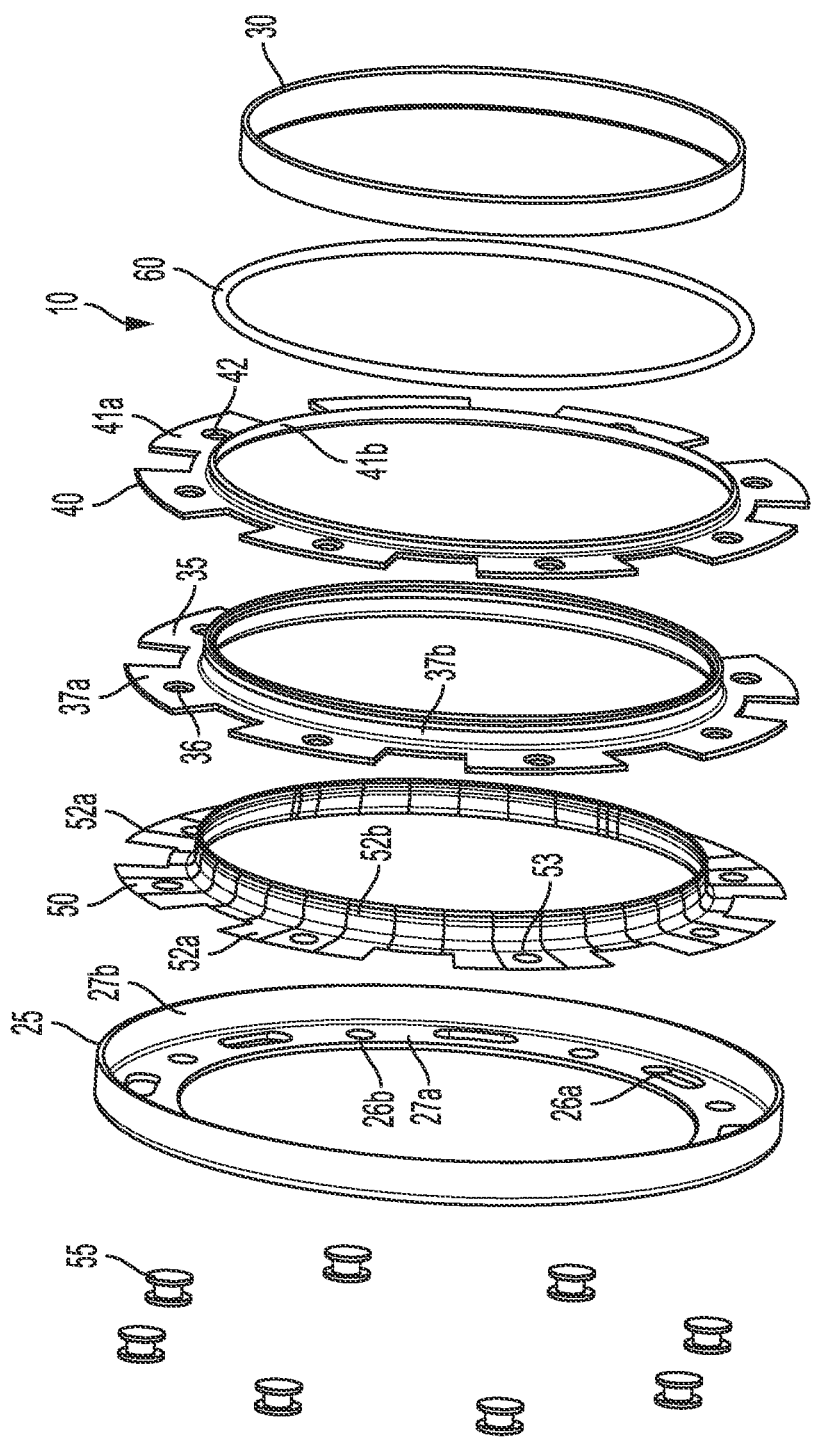
FIG. 1 is perspective view of a shunt assembly.

Certain terminology is used in the following description for convenience only and is not limiting. "Axially" refers to a direction along an axis (X) of an assembly. "Radially" refers to a direction inward and outward from the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

As shown in FIGS. 1-6D, a shunt assembly 10 is disclosed herein. The shunt assembly 10 generally can include a first conductive component 25 configured to engage with at least a first bearing ring 5a and a second conductive component 30 configured to contact at least a second bearing ring 5b. In one aspect, the first bearing ring 5a is an outer bearing ring and the second bearing ring 5b is an inner bearing ring. One of ordinary skill in the art would understand that this configuration can be reversed. In one example, the first conductive component 25 is formed as a mounting component, i.e. a conductive mounting shunt, and is configured to mount against the first bearing ring 5a, such as via a press fit or other connection arrangement. The first bearing ring 5a can include a shoulder or other structure that is configured to receive a portion of the first conductive component 25. The first conductive component 25 can have an L-shaped cross sectional profile, in one example.

The second conductive component 30 can be formed as a sleeve, in one example. The second conductive component 30 can be secured to either of the bearing rings 5a, 5b via a press-fit connection. One of ordinary skill in the art would understand from this disclosure that the shape of the second conductive component 30 can vary. Each of the first and second conductive components 25, 30 can be formed from an electrically conductive material, such as steel, and can be coated with another material, such as silver. One of ordinary skill in the art would understand that the conductive materials can vary.

Figure 2:
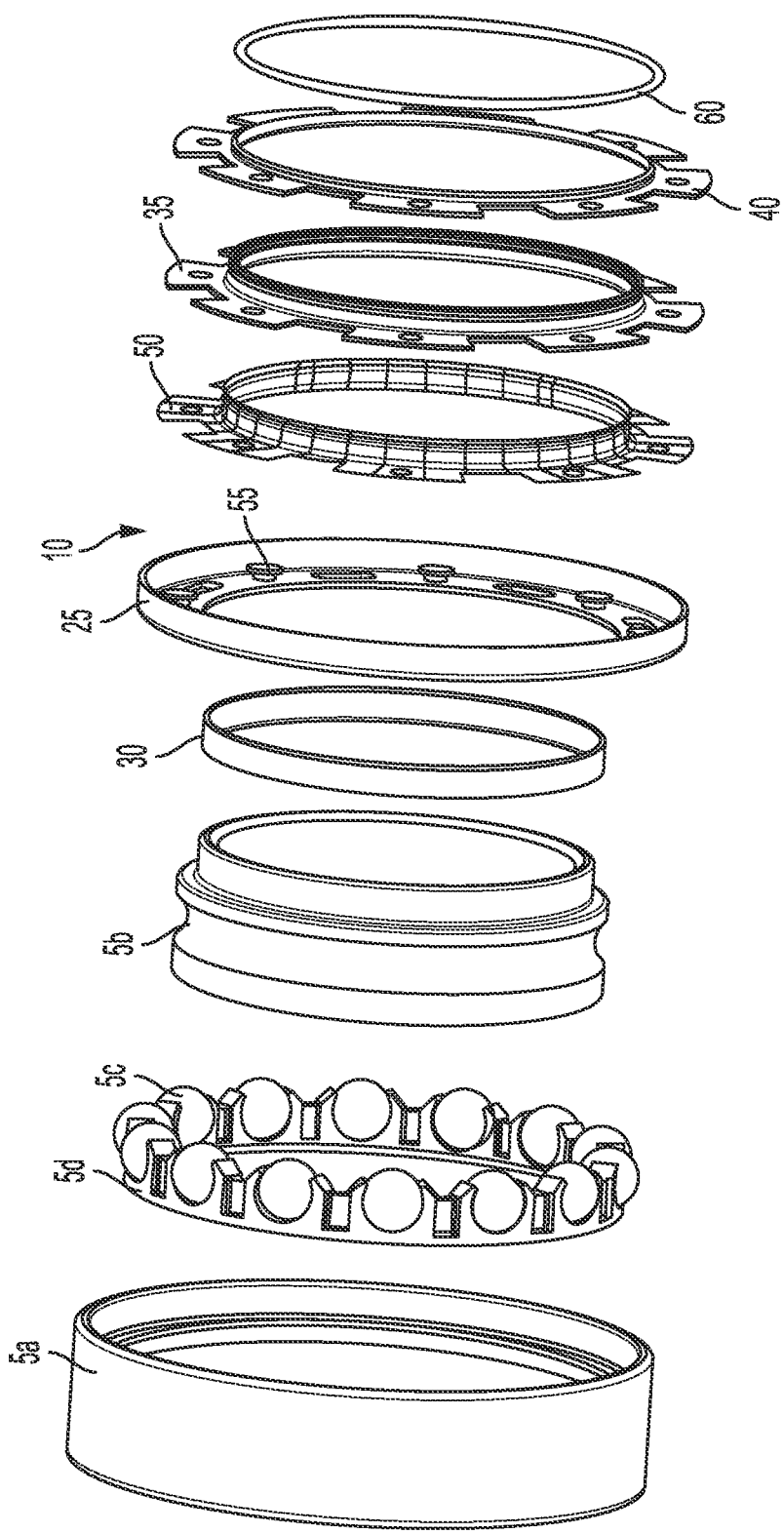
FIG. 2 is a perspective view of the shunt assembly of FIG. 1 and a bearing assembly.
Figure 3D:
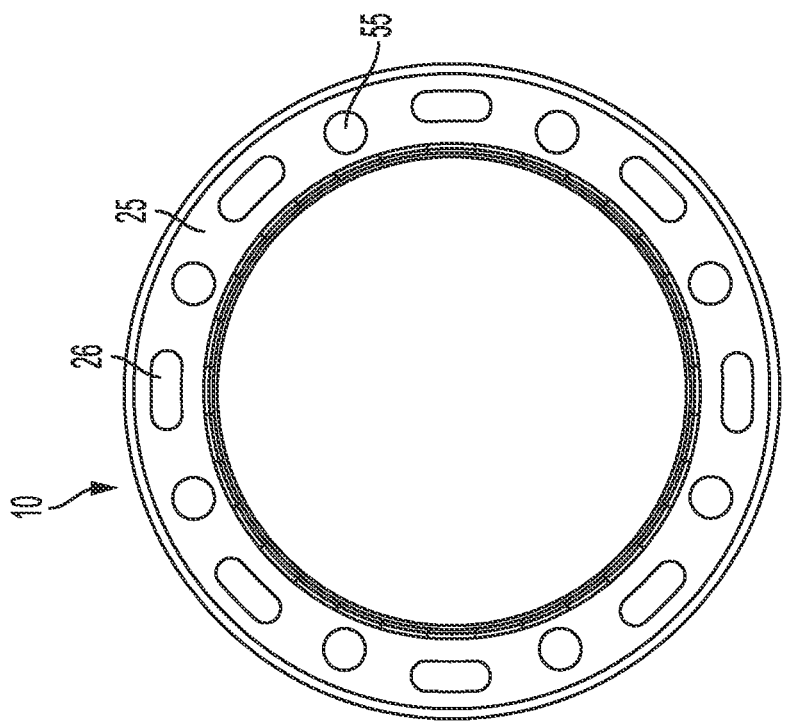
FIG. 3D is a front view of the shunt assembly.
Figure 3C:
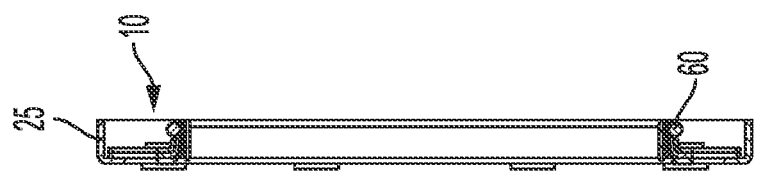
FIG. 3C is a side cross-sectional view of the shunt assembly in a region away from fastening components.
Figure 3B:
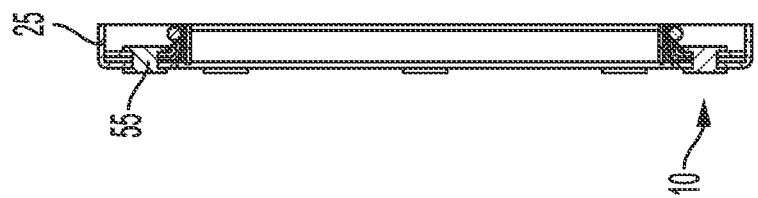
FIG. 3B is a side cross-sectional view of the shunt assembly in a region of fastening components.
Figure 3A:
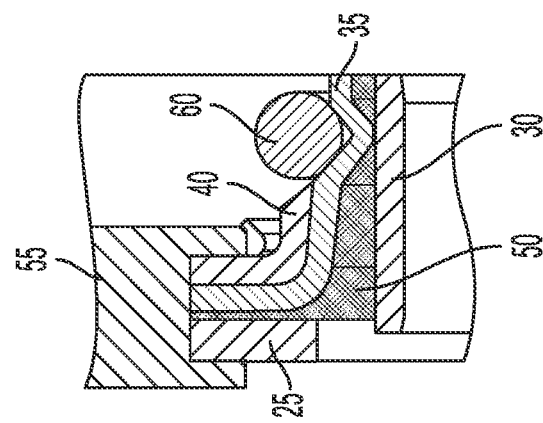
FIG. 3A is a magnified cross-sectional view of a portion of the shunt assembly of FIG. 1.
Figure 4D:
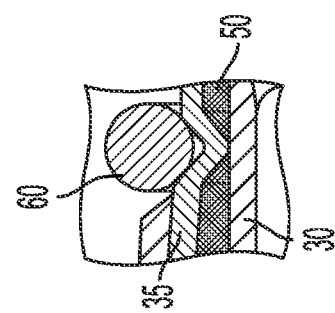
FIG. 4D is a magnified cross-sectional view through a preloading component of the shunt assembly.
Figure 4C:
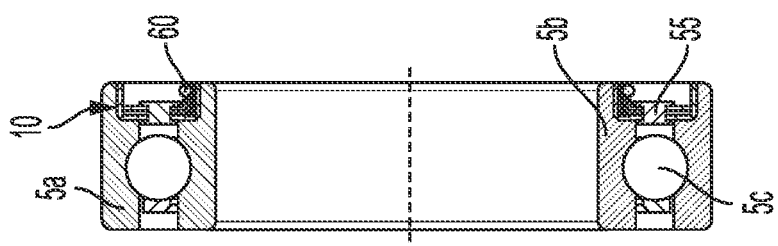
FIG. 4C is a cross-sectional view of the bearing assembly including the shunt assembly in region including fastening components.
Figure 4B:
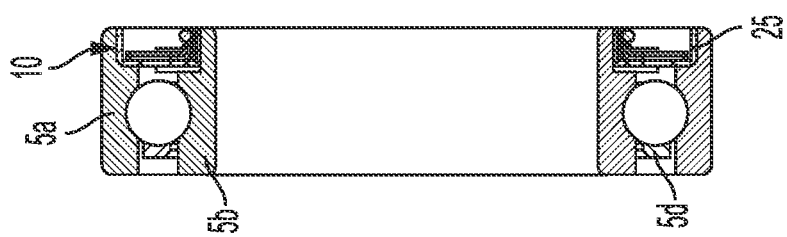
FIG. 4B is a cross-sectional view of a bearing assembly including the shunt assembly in a region away from fastening components.
Figure 4A:
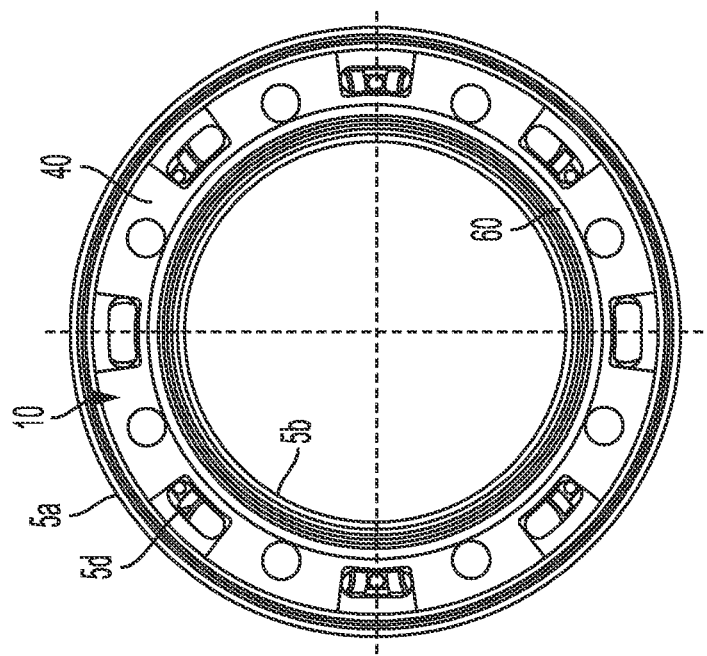
FIG. 4A is another front view of the shunt assembly.
Figure 5B:
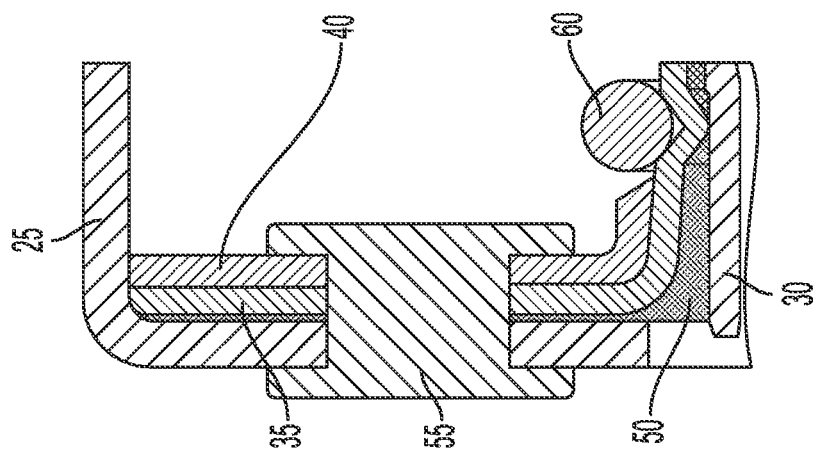
FIG. 5B is a cross-sectional view of the shunt assembly.
Figure 5A:
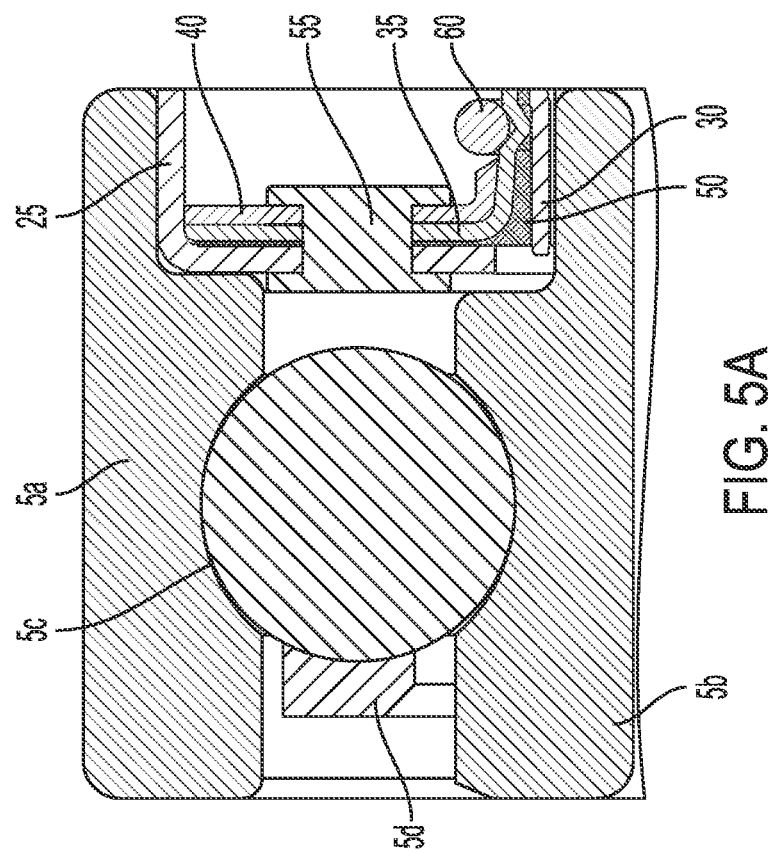
FIG. 5A is a cross-sectional view of a bearing assembly including the shunt assembly.
Figure 7:
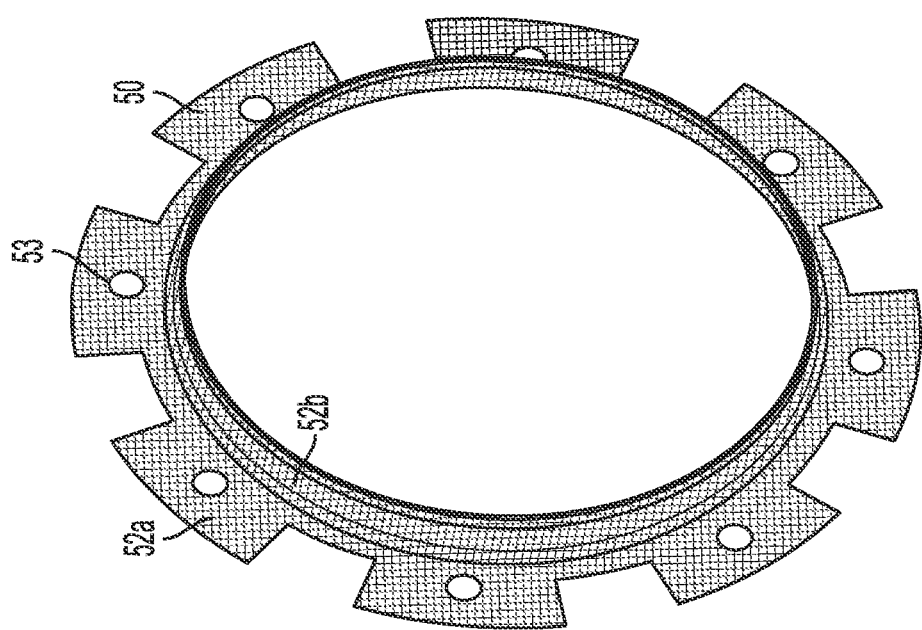
FIG. 7 is a perspective view of a mesh layer.

The first and second conductive components 25, 30 generally define an electrical connection or pathway that is configured to ensure any electrical discharge is directed away from the raceways of the bearing rings 5a, 5b. As shown in FIG. 2, rolling elements 5c can be arranged between the bearing rings 5a, a and a cage 5d can be provided for the rolling elements 5c. The specific configuration of the bearing assembly can vary.

A mesh layer 50 is provided that is configured to contact the first conductive component 25 and the second conductive component 30. The mesh layer 50 provides a conductive connection element between the first conductive component 25 and the second conductive component 30. As opposed to single fibers or filaments, the mesh layer 50 can be formed as a sheet-like element. In one example, the mesh layer 50 is formed from carbon fiber and is formed as a sheet. In one example, the mesh layer 50 is formed from ultra-conductive graphene sheets or carbon fiber fabric sheets. The mesh layer 50 can be formed with a unitary body extending circumferentially for 360 degrees, and can include a plurality of petals or extensions in a radial direction, which can define fastening regions as described in more detail herein. The mesh layer 50 can include a radial extension 52a that contacts the first conductive component 25, and an axial extension 52b that contacts the second conductive component 30. The radial extension 52a can define at least one opening 53 configured to receive a fastening component 55 that is configured to secure various components of the shunt assembly 10 with each other. The axial extension 52b can have an uninterrupted, 360 degree circumferential extent which ensures electrical contact with the second conductive component 30.

A preloading component 60 can be provided that is configured to apply a preload between the mesh layer 50 and the second conductive component 30. The preloading component 60 can apply a preload or force in a radially inward direction and against the mesh layer 50 to ensure adequate contact between the mesh layer 50 and the second conductive component 30. In one example, a cushioning layer 35 can be provided between the preloading component 60 and the mesh layer 50. The cushioning layer 35 can ensure adequate pressure is applied against the mesh layer 50 and can also provide protection or cushioning for the mesh layer 50 to avoid damage from the preload of the preloading component 60. The cushioning layer 35 can be formed from rubber, in one aspect. The cushioning layer 35 can be compressible and can be configured to deform under the force of the preloading component 60.

In one example, the cushioning layer 35 and the mesh layer 50 are connected with each other. For example, the cushioning layer 35 and the mesh layer 50 can be connected via at least one of (i) an epoxy between the cushioning layer 35 and the mesh layer 50, or (ii) overmolding of the cushioning layer 35 with the mesh layer 50. The epoxy can be formed from a conductive material, in one aspect, to further improve the EDM protection. One of ordinary skill in the art would understand that this connection could be achieved in a variety of ways.

In one example, a backing component 40 can be provided and the cushioning layer 35 and the backing component 40 can be connected with each other. The backing component 40 can act as a reinforcement element, in one example. The backing component 40 can be formed from steel, in one example. The cushioning layer 35 and the backing component 40 can be connected to each other via co-molding, in one example. One of ordinary skill in the art would understand that the backing component 40 can be embodied according to a variety of configurations, and can be omitted in some configurations.

To secure various elements of the shunt assembly 10 with each other, at least one fastening component 55 can be provided that is configured to secure at least the first conductive component 25, the cushioning layer 35, and the mesh layer 50 with each other. The fastening component 55 can include a plurality of rivets in one example. The fastening component 55 can be configured to extend through openings defined in each of the first conductive component 25 (i.e. openings 26b), the cushioning layer 35 (i.e. openings 36), and the mesh layer 50 (i.e. openings 53). The fastening component 55 ensures that adequate contact between the mesh layer 50 and the first conductive component 25 is maintained.

As best shown in FIG. 1, the cushioning layer 35, the mesh layer 50, and the backing component 40 can each include a plurality of radial extensions or portions that are circumferentially spaced apart from each other and space is defined between the radial extensions. This spacing between the radial extensions allows for a pathway for lubricant or other fluid into the associated bearing assembly. As shown in FIG. 1, the cushioning layer 35 can include at least one radial portion 37a and at least one axial portion 37b (i.e. sleeve). The radial portion 37a can include a plurality of extensions. The radial portion 37a can define the openings 36 for the fastening components 55. Similarly, the backing component 40 can also include at least one radial portion 41a, and at least one axial portion 41b. The backing component 40 can include multiple radial portions 41a that each define openings 42 for the fastening components 55.

The first conductive component 25 can include at least one lubrication passage 26a that is configured to provide a flow path through the shunt assembly 10. Based on the configuration disclosed herein, the shunt assembly 10 can be used in a wet environment (i.e. lubricated environment). The lubrication passages 26a can be defined circumferentially away from the openings 26b for the fastening components 55. The lubrication passages 26a can be larger than the openings 26b, in one example.

The first conductive component 25 can comprise a radial portion 27a and an axial portion 27b. The radial portion 27a can define the openings 26b for the fastening components 55 and the lubrication passages 26b. The axial portion 27b can be configured to be press fit or otherwise engage against one of the bearing rings 5a, 5b. The geometry of the first conductive component 25 can vary, as one of ordinary skill in the art would appreciate based on this disclosure.

The preloading component 60 can be formed according to a variety of configurations, shapes, styles, etc. In one example, the preloading component 60 is formed as an O-ring, as shown in FIGS. 1-6D. As shown in FIGS. 6B-6D, the preloading component 60 can include O-rings of various sizes. FIG. 6B shows a relatively small O-ring 60'. FIG. 6C shows a medium-sized O-ring 60". FIG. 6D shows a large O-ring 60"'. The size of the O-rings can vary depending on a variety of factors. The O-rings can be larger in order to provide a greater preload or force against the mesh layer 50, for example.

Figure 8C:
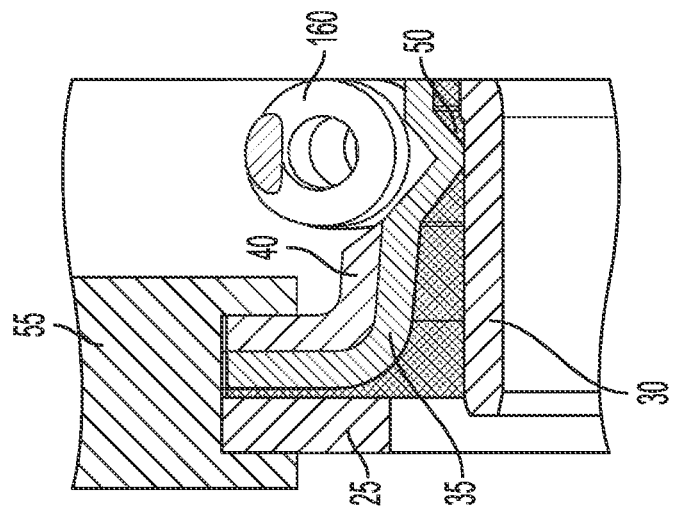
FIG. 8C is a magnified cross-sectional view of the shunt assembly of FIG. 8A.
Figure 8B:
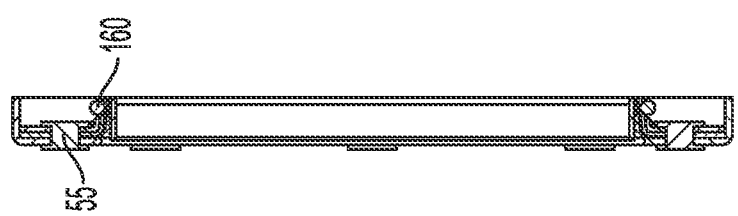
FIG. 8B is a cross-sectional view of the shunt assembly of FIG. 8A.
Figure 8A:
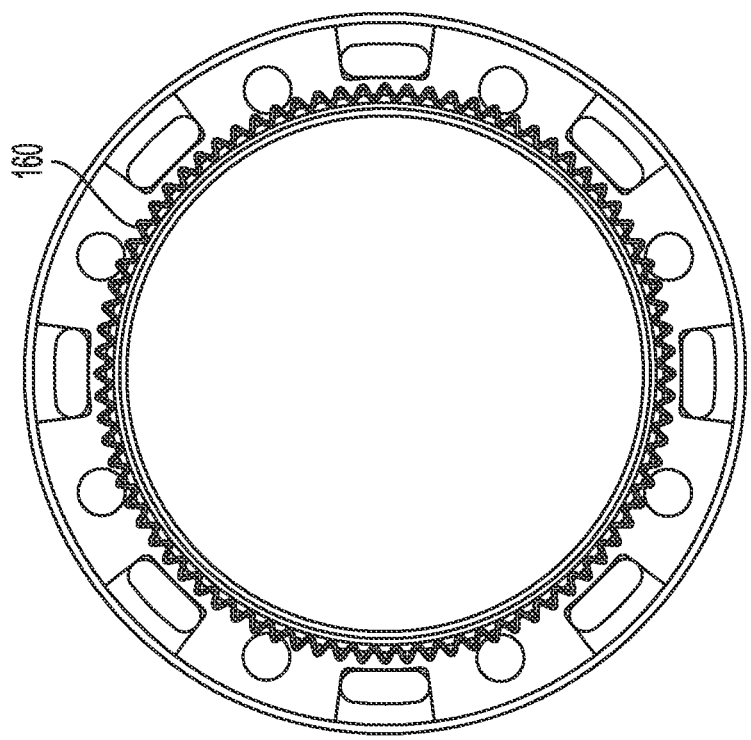
FIG. 8A is a front view of a shunt assembly including an alternative preloading component.

In another example, the preloading component 160 is formed as a spring, such as a garter spring, as shown in FIGS. 8A-8C. The garter spring can be configured to apply a greater preload than the O-ring, in one example.

In one aspect, this disclosure is for a non-sealed high-speed bearing application (i.e. greater than 20,000 RPM) that is required to operate in an environment where wet lubricant, such as ATF, flows through the bearing. This highly conductive shunt assembly is configured to safely conduct current to ground, preventing EDM damage to the bearing.

In one example, the shunt assembly 10 disclosed herein can be pre-packaged or installed with a bearing assembly, which simplifies installation.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS first bearing ring 5a
second bearing ring 5b
rolling elements 5c
cage 5d
shunt assembly 10
first conductive component 25
lubrication passage 26a
openings 26b
radial portion 27a
axial portion 27b
second conductive component 30
cushioning layer 35
openings 36
radial portion 37a
axial portion 37b
backing component 40
radial portion 41a
axial portion 41b
openings 42
mesh layer 50
radial extension 52a
axial extension 52b
openings 53
fastening component 55
preloading component 60, 60', 60", 60"', 160

What is claimed is:

1. A shunt assembly comprising:
a first conductive component configured to engage with at least a first bearing ring;
a second conductive component configured to contact at least a second bearing ring;
a cushioning layer;
a mesh layer contacting the first conductive component and the second conductive component, the mesh layer being arranged between the cushioning layer and the second conductive component, and the mesh layer including an axial extension configured to contact the second conductive component; and
a preloading component configured to apply a preload against at least the axial extension of the mesh layer.

2. The shunt assembly according to claim 1, wherein the mesh layer is formed from carbon fiber and is formed as a sheet.

3. The shunt assembly according to claim 1, wherein the mesh layer further includes at least one radial extension that contacts the first conductive component.

4. The shunt assembly according to claim 3, wherein the at least one radial extension defines at least one opening configured to receive a fastening component.

5. The shunt assembly according to claim 1, wherein the cushioning layer and the mesh layer are connected with each other.

6. The shunt assembly according to claim 5, wherein the cushioning layer and the mesh layer are connected via at least one of (i) an epoxy between the cushioning layer and the mesh layer, or (ii) overmolding of the cushioning layer with the mesh layer.

7. The shunt assembly according to claim 1, further comprising a backing component, wherein the cushioning layer and the backing component are connected with each other.

8. The shunt assembly according to claim 7, wherein the cushioning layer and the backing component are connected via co-molding.

9. The shunt assembly according to claim 1, further comprising at least one fastening component configured to secure at least the first conductive component, the cushioning layer, and the mesh layer with each other.

10. The shunt assembly according to claim 1, wherein the first conductive component includes at least one lubrication passage.

11. The shunt assembly according to claim 1, wherein the preloading component is an O-ring.

12. The shunt assembly according to claim 1, wherein the preloading component is a garter spring.

13. A shunt assembly comprising:
a first conductive component configured to engage with at least a first bearing ring;
a second conductive component configured to contact at least a second bearing ring; and
a mesh layer formed from a carbon fiber sheet and contacting the first conductive component and the second conductive component, the mesh layer including an axial extension configured to contact the second conductive component, wherein at least the axial extension of the mesh layer is configured to be pressed against the second conductive component by a preloading component;
wherein the first conductive component includes at least one lubrication passage.

14. The shunt assembly according to claim 13, further comprising a cushioning layer arranged against the mesh layer, wherein the cushioning layer is formed from rubber.

15. The shunt assembly according to claim 14, further comprising a preloading component configured to engage the cushioning layer to apply a preload to the mesh layer.

16. The shunt assembly according to claim 15, wherein the preloading component is an O-ring or a garter spring.

17. The shunt assembly according to claim 13, further comprising at least one fastening component configured to fasten the first conductive component with the mesh layer.

18. The shunt assembly according to claim 13, wherein the mesh layer includes at least one radial extension that contacts the first conductive component.

19. A shunt assembly comprising:
a first conductive component configured to engage with at least a first bearing ring;
a second conductive component configured to contact at least a second bearing ring; and
a mesh layer formed from a carbon fiber sheet and contacting the first conductive component and the second conductive component, the mesh layer including an axial extension configured to contact the second conductive component, wherein at least the axial extension of the mesh layer is configured to be pressed against the second conductive component by a preloading component;
wherein the mesh layer includes a plurality of radial extensions, each of the radial extensions defining an opening for a fastening component.

* * * * *